Jan. 19, 1937.　　　C. N. TEETOR　　　2,068,042

PISTON AND PISTON RING

Filed Oct. 30, 1933

Inventor
Charles N. Teetor
By Rector, Hibben, Davis and Macauley
Attys.

Patented Jan. 19, 1937

2,068,042

UNITED STATES PATENT OFFICE 2,068,042

PISTON AND PISTON RING

Charles N. Teetor, Hagerstown, Ind., assignor to The Perfect Circle Company, Hagerstown, Ind., a corporation of Indiana Application October 30, 1933, Serial No. 695,778

10 Claims. (Cl. 309—29)

My invention relates to piston and piston rings for internal combustion engines and the like.

The principal object of my invention is to provide within the usual rectangular groove of a piston a single inherently resilient compression ring having its upper inner portion removed to cause the ring to tilt and operate as an oil scraper ring, the ring alone being adapted to function efficiently without the use of adjuncts or other means, such as inner expander rings or springs, adjusting screws or other devices, a complemental ring, or a peculiarly shaped piston groove.

The object of the invention will appear more fully from the following description taken in connection with the accompanying drawing, in which.

Figure 1:
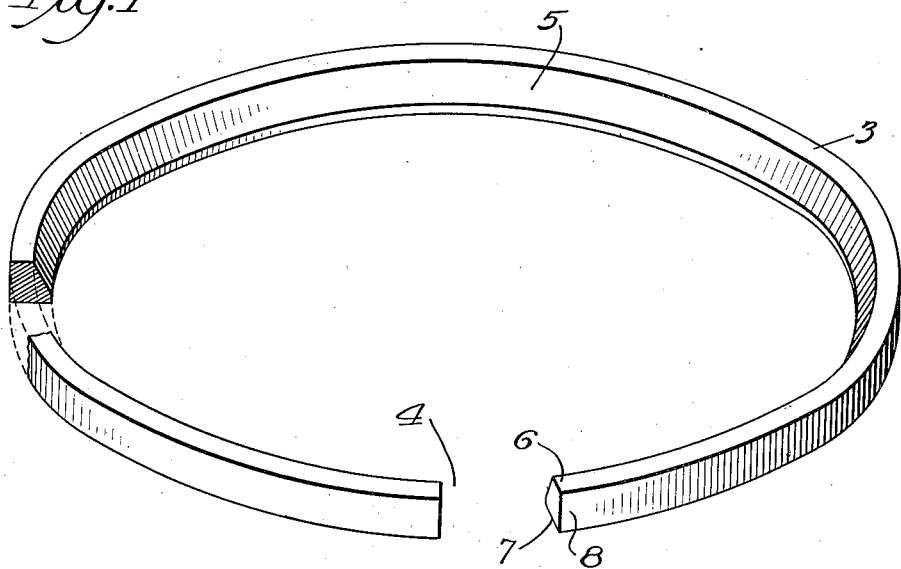
Figure 1 is a perspective view of my ring.

The one-piece ring 3, which is inherently resilient, is provided with the usual joint 4, which may be of any desired form. The ring is chamfered on its inner face 5, the chamfer extending downwardly and inwardly. Except for this chamfer the ring is rectangular in cross section, the upper and lower sides 6 and 7 being parallel and the outer cylinder contacting face 8 being perpendicular to the sides.

Figure 2:
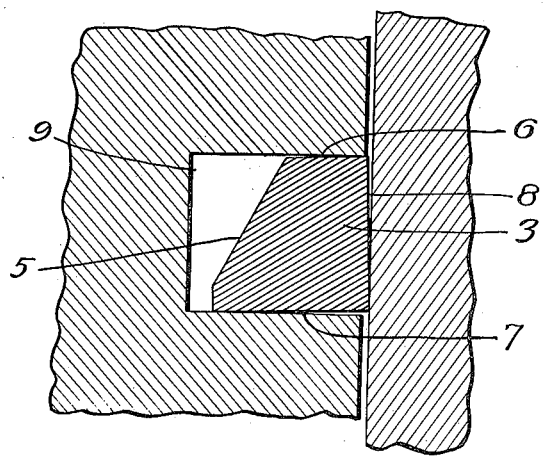
Fig. 2 is a fragmentary vertical section showing the ring within the piston groove and engaging the wall of the engine cylinder.

Fig. 2 shows the ring mounted in the piston groove 9 which is rectangular in cross section. When the piston and ring are placed in the cylinder, the contraction of the ring to the diameter of the cylinder causes the ring, by reason of its chamfer, to twist or distort and assume the condition illustrated somewhat exaggeratedly in Fig. 2. It will be observed that the lower outer corner (meaning the corner at the outer face of the ring and nearest the crank case) engages the cylinder wall most firmly and the inner lower corner is seated on the bottom side of the piston groove. There is minimum clearance between the cylinder and the piston immediately above and below the piston groove.

In operation, the ring maintains its tilted or distorted condition and scrapes the excess oil from the cylinder walls and an efficient seal is accomplished. Actual use of the invention demonstrates that my improved structure admirably performs the functions of a compression and scraper ring. The blowby is materially reduced and the oil mileage multiplied as compared with the performance of the conventional form of compression ring heretofore almost universally used.

It will be noted in particular that in my invention but one single ring is used in the plain groove and that it functions freely and alone in the groove in performing its stated functions. In other words, the action of the ring is inherent within itself and no adjuncts or auxiliaries are employed. I am aware that heretofore there have been made numerous suggestions with respect to chamfered rings, such, for example, as the use of two complementary chamfered or beveled rings in the same groove, or expanding springs behind a ring, or chamfered faces on the piston engaging the inclined faces on the ring, or set screws or other means for adjusting the ring. These prior suggested structures, besides being more complicated and costly, are not adapted to efficiently perform the functions accomplished by my invention. I have also found that the position of the chamfer on the ring is of prime importance. For example, if the ring is turned upside down so that the chamfer is at the lower inner corner, the structure will not function nearly as good as will the ordinary conventional compression ring. The chamfer, or equivalent formation, may be formed by actually cutting away or otherwise removing metal or in the casting operation of the ring and the words "cut away", "reduced" or "removed" as employed in the claims are each intended to embrace any of such operations.

I claim:

1. In combination, an internal combustion engine cylinder, a piston in said cylinder, said piston being provided with an imperforate rectangular groove, and a single inherently resilient split piston ring positioned within the groove and inherently free to contract and expand and twist or distort within the groove, the ring having substantially parallel upper and lower sides, disposed substantially within said piston groove, and an outer face substantially perpendicular to both of said sides, the upper portion of the inner face of the ring within the piston groove being reduced throughout the major portion of its periphery, whereby the ring is caused to twist or distort so that the outer lower corner of the ring is pressed most firmly against the cylinder wall and a circumferential seal is formed.

2. In combination, an internal combustion engine cylinder, a piston in said cylinder, said piston being provided with an imperforate rectangular groove, and a single inherently resilient split piston ring positioned within the groove and independently free in and of itself to contract and expand and twist or distort within the groove, said ring having substantially parallel upper and lower sides substantially disposed within said piston groove and an outer face substantially perpendicular to said sides, the upper portion of the inner face of the ring within the piston groove being uniformly cut away or reduced throughout its periphery, whereby the ring is caused to twist or distort so that its outer lower face portion contacts with the cylinder wall more firmly than the upper area of said face.

3. In combination, an internal combustion engine cylinder, a piston in said cylinder, said piston being provided with an imperforate rectangular groove, and a single inherently resilient split piston ring positioned within the groove and independently free in and of itself to contract and expand and twist or distort within the groove, the ring having upper and lower sides disposed substantially within said piston groove and an outer face substantially perpendicular to said sides, the upper portion of the inner face of the ring within the piston groove being cut away or reduced throughout the major portion of its periphery, the resiliency, shape and size of said ring and the diameter of the cylinder being so related and constructed and arranged as to permit the ring to twist or distort and thereby permit the lower face portion of the ring to most firmly engage the cylinder wall.

4. In combination, an internal combustion engine cylinder, a piston in said cylinder, said piston being provided with an imperforate rectangular groove, and a single inherently resilient split piston ring positioned within the groove and independently free in and of itself to contract and expand and twist or distort within the groove, the ring having substantially parallel upper and lower sides, substantially disposed within the piston groove, and an outer face substantially perpendicular to said sides, the metal content of said ring being reduced at a point removed from its cylinder contacting face and substantially located above the neutral axis of the ring, whereby the ring is permitted to twist or distort when it is compressed to cylinder diameter in its operative condition, and thereby press the lower outer corner of the ring most firmly against the cylinder wall, a circumferential seal being formed.

5. In combination, an internal combustion engine cylinder, a piston in said cylinder, said piston being provided with an imperforate groove of substantially rectangular cross section, and a single inherently resilient split piston ring, positioned within the groove and independently free in and of itself to contract and expand and twist or distort within the groove, the ring having one side face arranged substantially at a right angle to the cylinder contacting face thereof and having an unbalanced cross sectional area resulting from a reduction of an amount of metal from a major portion of the periphery of said ring at an inner corner thereof not including said right angle side face, sufficient to impart an inherent twist to said ring when contracted in the ring groove of said piston, said cylinder contacting face being of greater width than the rear face of said ring, and said ring being shaped, arranged and dimensioned and the piston groove and cylinder being dimensioned whereby when the ring is fitted into the said groove and contracted therein with the side of the ring having said reduced corner positioned uppermost, said ring will be twisted or distorted in said groove to maintain circumferentially extending seals, the lower outer portion of the face of the ring being pressed most firmly against the cylinder wall, the inner portion of the lower side of the ring being pressed most firmly against the lower side of the piston ring groove and the outer portion of the upper side of the ring being pressed most firmly against the upper side of said ring groove.

6. In combination, an internal combustion engine cylinder, a piston in said cylinder, said piston being provided with an imperforate groove of substantially rectangular cross section, and a single inherently resilient split piston ring, positioned within the groove and independently free in and of itself to contract and expand and twist or distort within the groove, the ring having one side face arranged substantially at a right angle to the cylinder contacting face thereof and having an unbalanced cross sectional area resulting from the formation of a chamfer extending throughout the periphery of said ring at an inner corner thereof not including said right angle side face, sufficient to impart an inherent twist to said ring when contracted in the ring groove of said piston, said cylinder contacting face being of greater width than the rear face of said ring, and said ring being so shaped, arranged and dimensioned and the piston groove and cylinder so dimensioned whereby when the ring is fitted into said groove and contracted therein with the side of the ring having the chamfer extending from it positioned uppermost, said ring will be twisted or distorted in said groove to maintain circumferentially extending seals, the lower outer corner of the ring being pressed most firmly against the cylinder wall, the inner lower corner of the ring being pressed against the lower side of the piston ring groove and the outer portion of the upper side of the ring being pressed against the upper side of said ring groove.

7. In combination, an internal combustion engine cylinder, a piston in said cylinder, said piston being provided with a substantially rectangular groove, and a single inherently resilient split piston ring positioned within said groove and inherently free in and of itself to contract and expand and twist or distort within the groove, the ring having upper and lower sides, disposed substantially within said piston groove, and a cylinder contacting face, the upper rear portion of the ring within the piston groove having part of its metal removed to give the ring an unbalanced cross section and cause the ring to so twist or distort that the lower portion of its outer face contacts most firmly with the cylinder wall during both the upstroke and downstroke of the piston.

8. In combination, an internal combustion engine cylinder, a piston in said cylinder, said piston being provided with a substantially rectangular groove, and a single resilient split piston ring positioned within said groove and adapted to contract and expand and twist or distort within the groove, said ring having upper and lower sides, disposed substantially within said piston groove, an outer face, and a chamfer on its rear face extending downwardly and rearwardly from the top side of the ring within said piston groove, said chamfer causing the ring to so twist or distort that the lower portion of its outer face engages most firmly with the cylinder wall during both the upstroke and downstroke of the piston.

9. In combination, an internal combustion engine cylinder, a piston in said cylinder, said piston being provided with an imperforate rectangular groove, and a single resilient split piston ring positioned within said groove and adapted to contract and expand and twist or distort within the groove, said ring having upper and lower sides substantially disposed within said piston groove, and an outer face, the upper portion of the ring having part of its metal removed at a point remote from the cylinder engaging face, to give the ring an unbalanced cross section and to cause the same to so twist or distort that the lower portion of its outer face contacts most firmly with the cylinder wall, during both the upstroke and downstroke of the piston.

10. In combination, an internal combustion engine cylinder, a piston in said cylinder, said piston being provided with a rectangular groove, and a single resilient split piston ring positioned within said groove and adapted to contract and expand and twist or distort within the groove, the inner face of said ring having at least a portion thereof non-parallel to the outer face thereof whereby the radial cross sectional area of said ring is un-symmetrical with a greater mass of metal disposed below a horizontal medial plane through said ring than above said plane, whereby to give the ring an unbalanced cross section and to permit the same to so twist or distort that the lower portion of its outer face contacts most firmly with the cylinder wall.

CHARLES N. TEETOR.